Jan. 18, 1938. J. R. THORP Re. 20,628

FROST SHIELD

Original Filed Oct. 27, 1933 2 Sheets-Sheet 1

INVENTOR.

J. R. Thorp

BY

Morsell, Lieber & Morsell

ATTORNEYS

Jan. 18, 1938. J. R. THORP Re. 20,628

FROST SHIELD

Original Filed Oct. 27, 1933 2 Sheets-Sheet 2

INVENTOR.

J. R. Thorp

BY

Morsell, Lieber & Morsell

ATTORNEYS.

Reissued Jan. 18, 1938

Re. 20,628

UNITED STATES PATENT OFFICE 20,628

FROST SHIELD

Joel R. Thorp, West Allis, Wis., assignor to The Fulton Company, West Allis, Wis., a corporation of Wisconsin Original No. 2,002,722, dated May 28, 1935, Serial No. 695,405, October 27, 1933. Application for reissue September 24, 1935, Serial No. 41,956

19 Claims. (Cl. 219—19)

The present invention relates generally to improvements in devices for insuring clear vision for the driver and other occupants of a vehicle, and relates more specifically to improvements in the construction and operation of so-called frost shields which are cooperable with the windshields and other windows of an automobile or other vehicle for the purpose of insuring a clear view of the external surroundings under most adverse weather conditions.

Generally defined, an object of the present invention is to provide an improved clear vision device, which is simple and durable in construction, and which is, moreover, highly efficient in operation.

Numerous appliances intended for the purpose of maintaining clear vision through the windshields and other windows of enclosed automobiles or the like, have heretofore been proposed, but all of these prior devices are more or less complicated, inefficient, and otherwise objectionable. A practical clear vision shield must not only be capable of accomplishing the desired result under the most adverse weather conditions, but it must also be durable in construction, neat in general appearance, unobstructive to the view at all times, and sufficiently simple to permit manufacture and sale thereof at moderate cost. It should not be necessary, with such a device, to resort to artificial heating of the shield under all vision obstructing weather conditions, since many of these conditions may be effectively combatted without such heat if a perfectly sealed air space is provided adjacent the window in the line of vision of the occupant of the car. Such an accessory is, moreover, desirable only during certain seasons of the year, and should, therefore, be readily removable from the window, and it should above all require minimum attention and offer least possible interference to the driver's view of the road.

It is a more specific object of the present invention to provide an improved frost shield which meets all of these desirable requirements, and which may be conveniently supplied with artificial heat whenever such is necessary.

Another specific object of the invention is to provide a simple and well constructed frame structure for detachable clear vision devices, whereby such devices will present a neat appearance and may be manufactured at minimum cost.

Still another specific object of the invention is to provide an electrically heated clear vision appliance which may be readily installed and operated, and which provides a hermetically sealed air space introducing a clear vision area of desirable dimensions in the line of vision of the driver or occupants of the vehicle with which the appliance is associated.

These and other objects and advantages of the improvement will be apparent from the following detailed description.

A clear conception of several embodiments of the invention, and of the construction and mode of operating several types of frost shields built in accordance therewith, may be had by referring to the drawings accompanying and forming a part of this specification in which like reference characters designate the same or similar parts in the various views.

Figure 1:
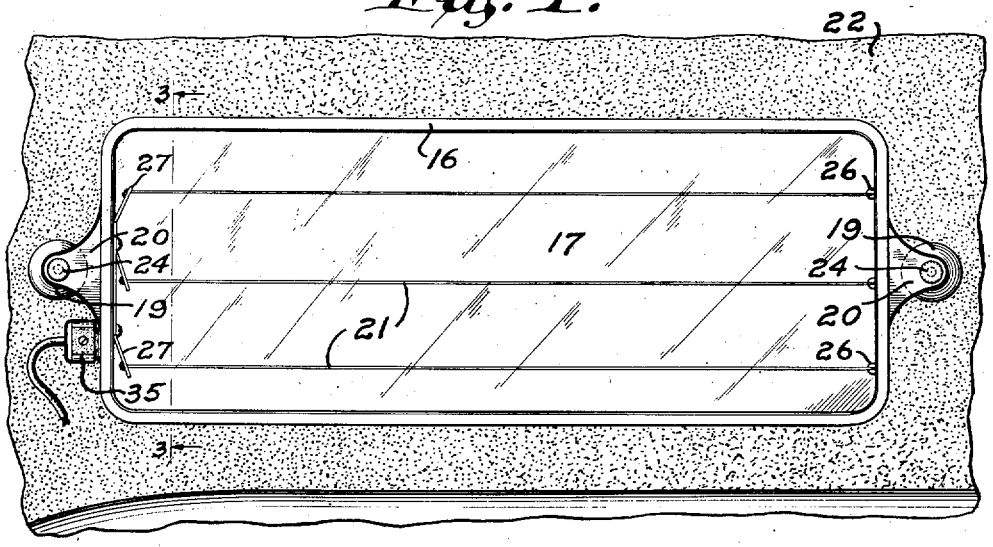
Fig. 1 is a rear view of a fragment of a frost coated vehicle windshield, showing one type of the improved frost shield attached to the rear surface thereof.
Figure 2:
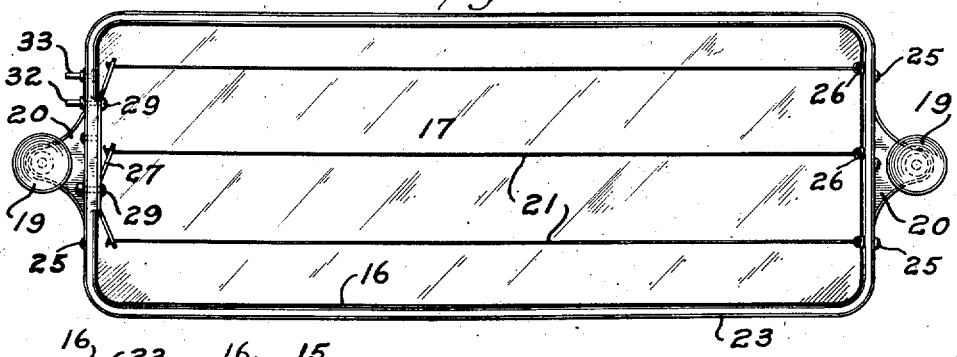
Fig. 2 is a reversed front view of the frost shield of Fig. 1, with the heater energizing plug connector omitted therefrom.
Figure 3:
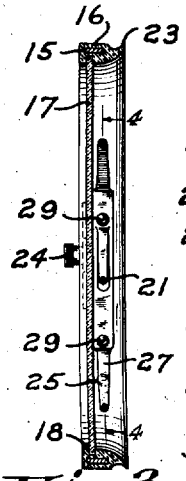
Fig. 3 is an enlarged transverse vertical section through the frost shield, taken along the line 3—3 of Fig. 1.

While the improved devices are generally designated herein as frost shields, it should be understood that these appliances are not merely capable of maintaining the windows to which they are applied, free from frost deposits, but also function to prevent other vision obstructing coatings or deposits.

Referring specifically to Figs. 1 to 7 inclusive of the drawings, the improved frost shield shown therein, comprises in general a substantially rectangular frame composed of a band 15 embedded within a continuous seal 16; a transparent sheet 17 coacting along its entire peripheral edge with a groove 18 formed in the seal 16; supporting elements 19 carried by end brackets 20 secured to the opposite ends of the main frame; and one or more heating elements 21 carried by and spanning the main frame adjacent to the transparent sheet 17.

The band 15 is preferably formed of resilient but relatively stiff material such as a flat metal strip, and the embedding seal 16 may be formed of rubber or other relatively flexible material moulded around and vulcanized or otherwise attached to the resilient core. This frame forming material may be produced in strip form, of proper length to provide a continuous sealing structure when bent into its final rectangular or other shape, and the groove 18 is of such depth that the metal strip or band will not be exposed, and so that a spacing cushion of rubber will always be interposed between the band 15 and the edge of the sheet 17 confined within the groove 18, as clearly indicated in Figs. 5, 6, and 7. The confined resilient band 15 of the frame may also be biased inwardly between the corners of the completed frame so as to insure retention of the edges of the sheet 17 within the groove 18, and the edge of the seal 16, which normally contacts with the main window 22 may be formed as a continuous highly flexible lip 23 in order to insure most effective sealing when the frame is in normal use.

Figure 4:
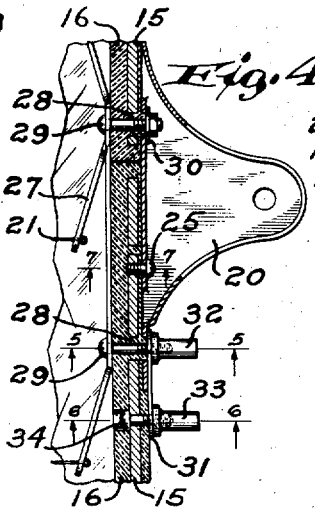
Fig. 4 is a fragmentary further enlarged longitudinal vertical section through the frost shield, taken along the line 4—4 of Fig. 3.

The transparent sheet 17 may be formed of ordinary glass, cut to fit snugly within the groove 18 of the seal 16, and is held by this groove some distance away from the main window 22 so as to provide an intervening air space. The supporting elements 19 may be ordinary rubber suction cups detachably secured to the end brackets 20 by means of clamping members 24 coacting with threaded studs formed integral with the cups. The brackets 20 may be formed of sheet metal, and are firmly attached to the metal band 15 by means of screws 25 as shown in Figs. 4 and 7, and although a thin sheet of rubber forming part of the seal 16, is interposed between the band 15 and each of the brackets 20, these brackets are conductively connected to the frame band by the screws 25.

Figure 5:
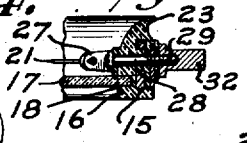
Fig. 5 is a similarly enlarged transverse section through the frame of the frost shield, taken along the line 5—5 of Fig. 4.
Figure 6:
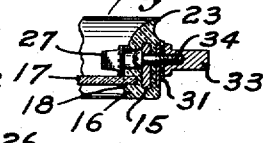
Fig. 6 is a likewise enlarged transverse section through the frame of the frost shield, taken along the line 6—6 of Fig. 4.
Figure 7:
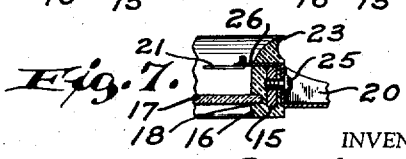
Fig. 7 is a similarly enlarged transverse section through the frame of the frost shield, taken along the line 7—7 of Fig. 4.

One of the brackets 20 is provided with integral metal ears 26 as shown in Fig. 7, and these ears 26 pierce the rubber seal 16 and may contact with the band 15, thus providing attaching loops for the adjacent ends of the wire heating elements 21. The metal band 15 provides an electrical conductor communicating with these ends of the elements 21, and the opposite ends of the elements 21 are attached to leaf spring conductors 27 secured to the opposite end of the main frame near the other bracket 20. The conductors 27 may be formed of one piece of metal, and coact with the inner face of the rubber seal 16 being insulated from the band 15 by rubber bushings 28 surrounding the attaching bolts 29, and by fibre insulating pieces 30, 31, as shown in Figs. 4 and 5. The bushings 28 are formed integral with the seal 16 and a contact point 32 serves as a clamping nut coacting with one of the bolts 29, while another contact point 33 is connected directly to the band 15 by means of a screw 34. With this assemblage of elements, the corresponding ends of the wire heating elements 21 are conductively connected through the conductors 27 and one of the bolts 29 with the contact point 32, being insulated from the band 15; and the opposite corresponding ends of these wires are conductively connected through bracket 20, band 15 and screw 34 with the other contact point 33. The points 32, 33 are however insulated with respect to each other by the insulating piece 31, and a detachable plug connector 35 is adapted to connect the points 32, 33 with any suitable source of electric current such as the battery of an ordinary automobile. As previously indicated, the wire heating elements 21 span the interior of the main frame, being located within the air space provided by the seal 16 and sheet 17, and also being spaced both from the sheet 17 and from the main window 22.

Referring specifically to Figs. 8 to 13 inclusive of the drawings, the improved modified frost shield shown therein, comprises in general a substantially rectangular frame composed of a band 15′, a continuous seal 16′, and an outer retainer 36; a transparent sheet 17′ coacting along its peripheral edge portion with a groove formed by the adjacent edge of the seal 16′ and by an inwardly projecting flange 37 of the retainer 36; supporting elements 19′ carried by brackets 20′ formed integral with the retainer 36 at the four corners thereof; and one or more heating elements 21′ carried by and spanning the main frame adjacent to the transparent sheet 17′.

The band 15′ is again preferably formed of relatively stiff resilient flat metal strip, while the seal 16′ is formed of rubber having a continuous outwardly directed sealing flange 23′ at one edge thereof and also having an inwardly directed spacer flange 38 disposed between the sheet 17′ and the adjacent edge of the band 15′. The outer retainer 36 and the brackets 20′ may be formed of one piece of sheet metal, and the three frame elements are permanently interconnected to provide a unitary structure, by means of split rivets 25′ which may have insulating washers 30′ for electrically insulating the band 15′ from the retainer 36 as shown in detail in Fig. 13. The transparent sheet 17′ which is also preferably formed of glass, is confined along its entire peripheral edge, between the inner edge portion of a resilient flange 37 of the retainer 36 and the flange 38 of the seal 16′, and these flanges by virtue of their resiliency will provide a tight seal without subjecting the sheet 17′ to excessive stresses due to the clamping of the frame elements to each other. When the outer flange 23′ is brought in contact with a main window 22, a sealed air space is again provided between the sheet 17′ and window 22 within the frame. The supporting elements 19′ may also be ordinary rubber suction cups detachably secured to the end brackets 20′ by means of clamping members 24′ engaging threaded studs secured to the cups, as clearly shown in Fig. 12.

Figure 8:
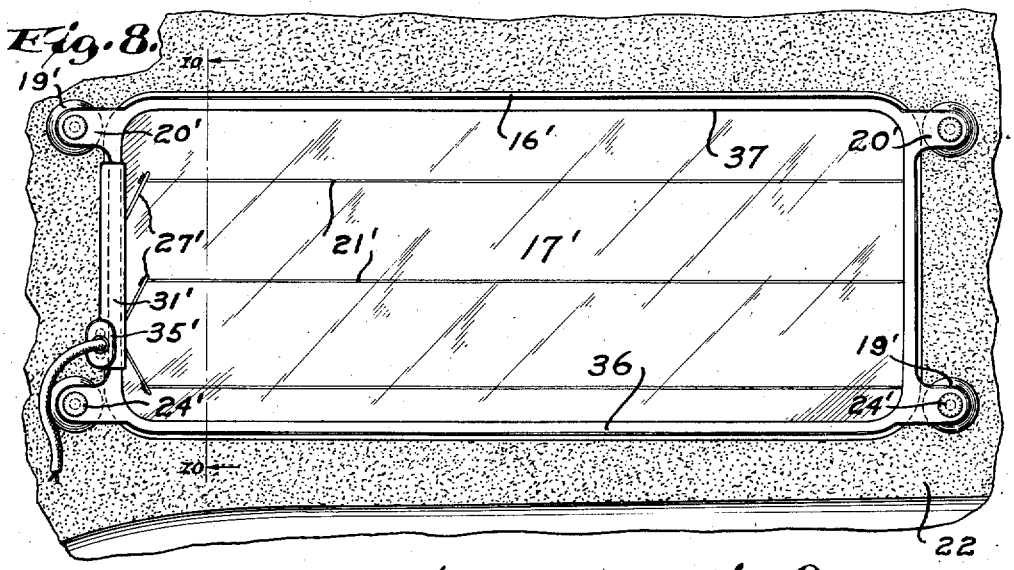
Fig. 8 is a rear view of a fragment of a frost coated vehicle windshield, showing another type of improved frost shield attached to the rear surface thereof.
Figure 9:
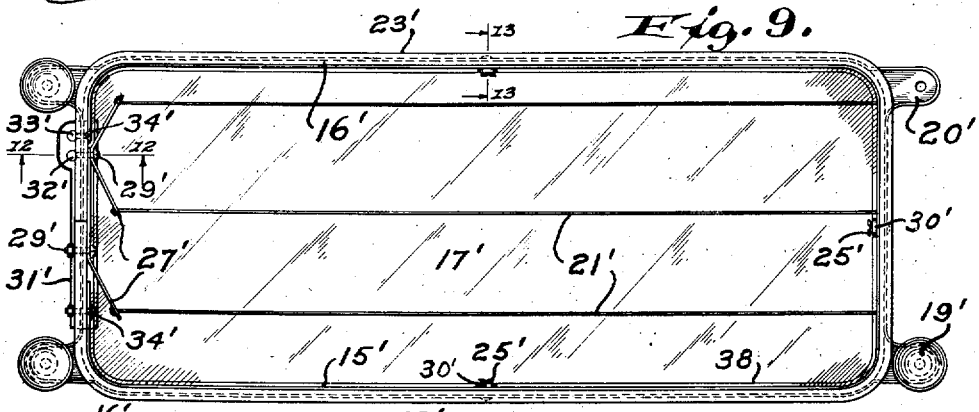
Fig. 9 is a reversed front view of the frost shield of Fig. 8, with the heater energizing plug connector omitted therefrom.
Figure 10:
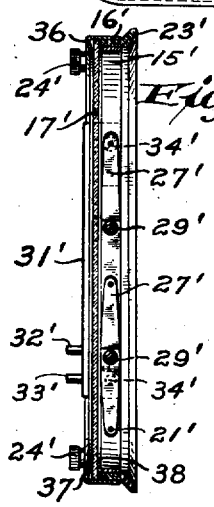
Fig. 10 is an enlarged transverse vertical section through the modified frost shield, taken along the line 10—10 of Fig. 8.
Figure 11:
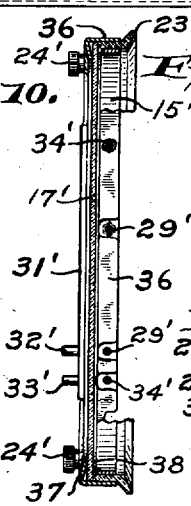
Fig. 11 is a similarly enlarged similar section through the modified frost shield showing portions of the structure omitted so as to clearly illustrate the frame construction.
Figure 12:
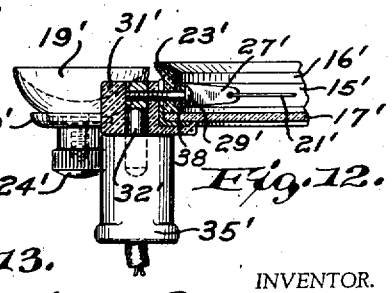
Fig. 12 is a further enlarged transverse section through the frame of a modified frost shield, taken along the line 12—12 of Fig. 9.
Figure 13:
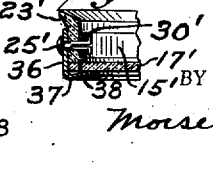
Fig. 13 is a similarly further enlarged transverse section through the frame of the modified frost shield, taken along the line 13—13 of Fig. 9.

The wire heating elements 21' of the modified frost shield, have their corresponding ends secured directly to the adjacent short side of the frame band 15' and within the seal 16', and have their opposite corresponding ends connected to leaf spring conductors 27', as disclosed in Figs. 8 and 9. These heating elements are again spaced from both the sheet 17' and the window 22 and are disposed within the air space previously described, and the extreme ends of the band 15' are spaced from the conductors 27' being supported directly from an insulating block 31' by means of screws 29'. The screws 29' pass directly through the rubber seal 16' but do not touch the outer retainer 36, being insulated from this retainer as shown in Figs. 11 and 12, and one of these attaching screws 29' serves to hold a contact point 32' within the insulator block 31'. Another contact point 33' is likewise held within the insulator block 31', by means of a screw 34' which coacts directly with the adjacent end of the band 15', but is also insulated from the outer retainer 36 as indicated in Fig. 11. A plug connector 35' is adapted to coact with the contact points 32', 33', and it is to be noted that the band 15' functions as a conductor associated with corresponding ends of the wire elements 21', while the conductor 27' is similarly associated with the opposite corresponding ends of these elements. The outer retainer 36, is, however, insulated from both the band 15' and conductor 27', and is never charged with electric current.

From the foregoing description, the manner of attaching the improved frost shield to a main windshield, should be clearly apparent, it being preferable in applying one of these shields to a window, to have the suction cups and the continuous seal provided at their contacting surfaces with a slight amount of sealing fluid in order to improve the holding and sealing effect. In order to utilize the heating elements, it is only necessary to attach the plug connector, whereupon the wires spanning the interior of the frame will heat the confined air within the space between the transparent sheet and the main window, and will thereby effectively prevent frost and other moisture from accumulating upon the outer surface of the main window and will thus insure clear vision. It is not, however, necessary to utilize the heating elements, since the provision of an air space alone will tend to maintain clear vision through the main window. In each of the frost shields disclosed, the metal band cooperating with the rubber seal, serves the dual function of retaining the seal in shape and of supporting the heating elements, and in no case is the outer retaining frame charged so that short-circuiting might occur. Both of these frost shields can be readily manufactured at relatively low cost, and have been found extremely effective in accomplishing their intended purposes. The improved frame structures present a neat and highly finished appearance, and produce minimum obstruction to the view of the occupants of a vehicle with which they are associated, and by preventing direct contact between the transparent shields and the supporting metallic parts, breakage of these shields is effectively eliminated. If so desired, the suction cup attachers may be omitted entirely and the cementing of the seals to the window may alone be resorted to and in some instances the heating elements may be entirely omitted from the appliances. It should also be noted that two or more suction cups appropriately arranged about the outer frame, may be utilized in either of the improved structures instead of the precise number of cups shown, and that the use of the heating elements is desirable when ice, sleet and frost are to be dispelled. The fact that the flange 37 only has line edge contact with the glass sheet, is also of importance in eliminating glass breakage, and the retainer frame 36 need not necessarily be insulated from the conductor band 15'.

It should be understood that it is not desired to limit the invention to the exact details of construction herein shown and described, for various modifications within the scope of the claims may occur to persons skilled in the art.

It is claimed and desired to secure by Letters Patent:

1. In combination, a frame comprising a metal band embedded within a rubber seal, a transparent sheet coacting along its entire peripheral edge with said seal within said band, said band being spaced from the peripheral edge of said sheet and biased to press said seal into intimate contact with said sheet edge, and heating means carried by said band and disposed within said frame.

2. In combination, a frame comprising a continuous metal band embedded entirely within a rubber seal having a groove therein within said band, a transparent sheet coacting with said groove and spaced from said band, and heating means comprising a wire spanning said frame, said wire having one end conductively connected to said band and having its opposite end insulated therefrom.

3. In combination, a frame comprising a continuous rectangular metal band embedded within a rubber seal having a groove in the side thereof and having a flexible lip remote from the groove, a transparent sheet coacting with said groove entirely within and spaced from the band, and a supporting bracket for connecting the ends of the band to produce a continuous frame while maintaining the adjacent ends of the band spaced apart.

4. In combination, a frame comprising a metal band, a transparent sheet disposed entirely within said band near one edge thereof, a continuous rubber seal supported by said frame and forming a lining for the interior of said band, said seal having a continuous preformed internal groove receiving the edge of said sheet and providing an inwardly projecting flange at one edge of the seal coacting directly with the peripheral portion of said sheet and also having a continuous preformed outwardly directed sealing lip at its opposite edge projecting laterally with respect to the opposite edge of said band, and heating means carried by said band and spanning said frame.

5. In combination, a frame comprising a continuous metal band coacting with a rubber seal forming a lining for the interior of the band and having inwardly and outwardly extending preformed continuous integral portions at the opposite edges thereof, a transparent sheet coacting along its entire peripheral edge with said inwardly projecting seal portion within said band, said outwardly extending seal portion being disposed beyond the edge of said band remote from said sheet and projecting outwardly beyond the periphery of said band and said band being resilient and biased inwardly to press said seal into intimate contact with said sheet edge, and heating means carried by said band and disposed within said frame.

6. In combination, a frame comprising a continuous metal band, a transparent sheet disposed entirely within said band near one edge thereof, a continuous rubber seal supported by said frame and forming a lining for the interior of said band, said seal having a continuous preformed groove coacting directly with the entire peripheral edge portion of said sheet and also having a continuous preformed outwardly directed sealing lip remote from said groove and projecting outwardly beyond said band, and heating means carried by said band and spanning said frame.

7. In combination, a frame comprising a continuous metal band coacting with a rubber seal forming a lining for the interior of the band and having a continuous preformed internal groove and a continuous preformed outwardly extending lip adjacent the opposite edges thereof, a transparent sheet coacting along its entire peripheral edge with said groove within said band, said outwardly extending lip being disposed beyond the edge of said band remote from said sheet and projecting outwardly beyond the periphery of said band and said band being formed to press said seal into intimate contact with said sheet edge, and heating means carried by said band and disposed within said frame.

8. In combination, a continuous metal frame, a transparent sheet disposed entirely within said frame near one edge thereof, a continuous rubber seal supported by and forming a lining for the interior of said frame, said seal having a continuous preformed internal groove for directly receiving the entire peripheral edge portion of said sheet and also having a continuous preformed laterally projecting sealed lip remote from said groove and extending outwardly beyond said frame, and heating means carried by and disposed within said frame.

9. In combination, a rectangular frame coacting with a rubber seal forming a lining for the interior of the frame and having a continuous preformed internal groove and a continuous preformed outwardly extending lip adjacent the opposite edges thereof, a transparent sheet having its entire peripheral edge confined within said groove, said lip being disposed beyond the edge of said frame remote from said sheet and projecting outwardly beyond the periphery of said frame and said frame being formed to press said seal into intimate contact with said sheet edge, and heating means carried by said band and disposed within said frame.

10. A windshield heater comprising a pane of glass, a glass-carrying member of rubber encircling the pane of glass and having on its inner face a groove in which the edge of the glass is received and also having a windshield-engaging lip, said glass-carrying member having a uniform cross-sectional area throughout, a metal supporting member encircling the glass-carrying member and clamping the latter to the edge of the glass, said metal supporting member having offset portions associated therewith, and suction cups carried by the offset portions for securing the heater to a windshield.

11. A windshield heater comprising a pane of glass, a glass-carrying member of rubber encircling said pane of glass and having on its inner face a groove in which the edge of the glass is received and also having a windshield-engaging lip, a band of metal encircling the glass-carrying member and holding the latter in clamping relation to the edge of the glass, said band of metal having outwardly-extending arms associated therewith, suction cups carried by said arms for attaching the heater to a windshield and an electric heating element extending from one side to the other of the heater and situated on the windshield side of the pane of glass.

12. A windshield heater comprising a pane of glass, a glass-carrying member of rubber encircling the glass and having on its inner face a groove to receive the edge of the glass and also having a windshield-engaging lip, a metal supporting member encircling the rubber glass-carrying member and holding the latter clamped to the edge of the glass, said metal supporting member having outwardly-extending arms associatd therewith, suction cups carried by said arms for holding the heater to the windshield, an electric heating unit carried by the supporting frame and situated on the windshield side of the glass.

13. A windshield heater comprising a pane of glass, a glass-carrying member of rubber encircling the pane of glass and having on its inner face a preformed groove in which the edge of the glass is received and also having a windshield-engaging lip, said glass-carrying member having a uniform cross-sectional area throughout, a metal supporting member encircling the glass-receiving groove and clamping the glass-carrying member to the edge of the glass, said metal supporting member having outwardly extending rigid portions associated therewith, and suction cups carried by said outwardly extending portions for securing said metal supporting member to a windshield.

14. A windshield heater comprising a pane of glass, a glass-carrying member of rubber encircling said pane of glass and having on its inner face a preformed groove to receive the edge of the glass and also having a windshield-engaging lip, a frame of metal encircling the glass-engaging groove and holding said glass-carrying member in clamping relation to the edge of the glass, said frame having outwardly extending portions associated therewith, suction cups carried by said outwardly extending portions for attaching the heater to a windshield, and an electric heating element extending from one side to the other of said frame and situated on the windshield side of the pane of glass.

15. A windshield heater comprising a pane of glass, a glass-carrying member of rubber encircling the glass and having on its inner face a preformed groove to receive the edge of the glass and also having a windshield-engaging lip, a metal supporting frame encircling the groove and holding said glass-carrying member clamped to the edge of the glass, said frame having rigid outwardly extending portions associated therewith at the opposite ends thereof, suction cups carried by said outwardly extending portions for attaching said frame to the windshield, and an electric heating unit carried by and spanning the supporting frame and situated on the windshield side of the glass.

16. In combination, a continuous rubber seal having an inner groove and a continuous outwardly directed flexible lip disposed laterally of said groove, a transparent sheet having its peripheral edge confined within said groove, a continuous metal band embracing the grooved portion of said seal in the plane of said sheet and disposed remote from said lip, suction cups for attaching said band to a windshield with said lip in contact with the latter, and heating means spanning the space within said seal between said sheet and the windshield.

17. In combination, a continuous rubber seal having an inner groove and a continuous outwardly directed flexible lip disposed laterally of said groove, a transparent sheet having its peripheral edge confined within said groove, a continuous metal band embracing the grooved portion of said seal in the plane of said sheet and disposed remote from said lip, and suction cups for attaching said band to a windshield with said lip in contact with the latter.

18. In combination, a continuous rubber seal having an inner preformed groove and a continuous flexible lip disposed laterally of said groove, a transparent sheet having its peripheral edge confined within said groove, a metal band embracing the grooved portion of said seal in the plane of said sheet and disposed remote from said lip, suction cups for attaching said band to a windshield with said lip in contact with the latter, and heating means spanning the space within said seal between said sheet and the windshield.

19. In combination, a continuous rubber seal having an inner preformed groove and a continuous flexible lip disposed laterally of said groove, a transparent sheet having its peripheral edge confined within said groove, a metal band embracing the grooved portion of said seal in the plane of said sheet and disposed remote from said lip, and suction cups for attaching said band to a windshield with said lip in contact with the latter.

JOEL R. THORP.